United States Patent Office 2,911,297
Patented Nov. 3, 1959

2,911,297
PROCESSES FOR THE INTRODUCTION OF ALLOYING CONSTITUENTS INTO METAL MELTS

Johann Florenz, Dusseldorf, Germany, assignor to Hugo Wachenfeld, Dusseldorf-Oberkassel, Germany No Drawing. Application May 3, 1957
Serial No. 656,769

Claims priority, application Germany May 5, 1956

7 Claims. (Cl. 75—135)

This invention relates to a process for introducing alloying constituents into metal melts. The introduction of alloying constituents, especially those having high melting points such as manganese, copper, nickel and chromium, has hitherto given rise to considerable difficulty.

According to the present invention, the alloying constituents to be introduced into the metal melt, for example, a light metal melt, are introduced in the form of a briquette made from a mixture of the powdered alloying constituent and a dispersing substance which, when the briquette is introduced into the melt, disrupts the briquette and disperses the alloying constituent throughout the melt. The dispersing substance preferably consists of a salt which, after the introduction of the briquette into the melt, gives off a reactive gas, vapour or liquid which reduces the partial pressure of the molten metal and/or effects a scavenging and purification of the melt.

When the briquette, which is used in accordance with the invention, is introduced into the melt, the dispersing substance contained in it effects a spontaneous and extremely effective dispersion of the powdered alloying constituents, which owing to their large surface area are then able to dissolve particularly quickly in the melt.

Salts which split off chlorine are particularly suitable as dispersing substances. Preferably, chlorides, which consist wholly or at least partly of those of the alloy constituents which are to be introduced into the melt, are used as dispersing substances. If, for example, powdered manganese is used as the alloying constituent the dispersing substance may consist, for example, of manganous chloride. If several substances are to be alloyed in a light metal melt, then one of the alloying constituents in the form of a chlorine salt and the other in the form of metal powder can be made into a briquette which may then consist, for example, of powdered nickel and manganous chloride or powdered lead and lead chloride or another chlorine compound.

The proportion of the powdered alloying constituents in the mixture to be briquetted is preferably so regulated that it is equal to about ten times the amount of salt which is added for the purpose of developing the reactive gases, vapours or liquids.

Briquettes which are particularly effective contain as the dispersing substance, in addition to a salt of the alloying constituent, one or more other salts which are related to the salt of the alloying constituent. For example, if the alloying and dispersing salt consists of manganous chloride, then sodium chloride and/or potassium chloride are suitable as the additional salt. In this way by the formation of binary, ternary and higher salt mixtures, a lowering of the melting point is effected and finally the additional salts also have a favourable influence on the salt containing the alloying constituent, for example, the manganous chloride.

Excellent results can be obtained for the purpose of alloying a light metal melt with manganese by using briquettes which contain about 80% powdered manganese, about 10% manganous chloride and about 10% of other chlorine salts (preferably 5% sodium chloride and 5% potassium chloride). In some cases there may also be added to the briquette small proportions of substances which are able to give off deoxidizing products during the alloying, for example, fluorides.

The process of the invention is highly economical. For the light metal melts under consideration, the alloying constituents which only melt at high temperatures are brittle so that they can be pulverised without great expense. The pressing of the pulverised alloying constituents together with the substance which evolves a reactive gas, vapour or liquid, for example the salt, also gives rise to no difficulty. The same applies to the introduction of the briquettes into the melt because the specific gravity of the briquette can easily be adjusted in such a way that the briquette is rapidly submerged and remains submerged until the dispersing substance has driven the powder into the melt. In spite of the spontaneous disruption of the briquette in the melt, it boils up only to a slight extent if the addition of the dispersing substance is made in the right proportion.

In the preceding specification, for the sake of simplicity, only the use of powdered manganese as the alloying constituent has been described. It is understood, however, that the process of the invention can be carried out with like effect also with all other alloying constituents which are usually introduced into metal melts, for example, with pulverised copper, nickel or chromium.

I claim:

1. A process for introducing metal alloying constituents which melt at high temperatures into a metal melt in which the metal alloying constituent is introduced into the metal melt in the form of a briquette which contains the alloying constituent in the form of powdered metal and at least one dispersing salt, said powdered metal and said dispersing salt being present in a proportion of approximately 10 parts powdered metal to one part dispersing salt, said dispersing salt, upon introduction into the metal melt, being capable of evolving a gas of sufficient pressure to disrupt the briquette spontaneously and thus dispersing the alloying constituent throughout the melt.

2. The process according to claim 1, wherein said salts are chlorides and the gas evolved is chlorine.

3. The process according to claim 1, wherein said alloying constituent is manganese and said dispersing salt manganous chloride.

4. The process according to claim 1, wherein said briquette is composed of 80 percent powdered manganese, 10 percent manganous chloride, 5 per cent sodium chloride and 5 percent potassium chloride.

5. The process according to claim 1, wherein one of the salts is the salt of the same metal as the alloying constituent.

6. The process according to claim 1, wherein one of the salts is a fluoride deoxidizing agent.

7. The process according to claim 2, wherein the chloride is selected from the group consisting of sodium chloride and potassium chloride.

References Cited in the file of this patent

UNITED STATES PATENTS

| | | |
|---|---|---|
| 2,287,888 | Kroll | June 30, 1942 |
| 2,452,894 | Ball et al. | Nov. 2, 1948 |
| 2,452,912 | Emley | Nov. 2, 1948 |
| 2,452,914 | Emley | Nov. 2, 1948 |
| 2,576,763 | Linz | Nov. 27, 1951 |
| 2,671,019 | Du Rostu | Mar. 2, 1954 |
| 2,788,271 | Emley | Apr. 9, 1957 |

FOREIGN PATENTS

| | | |
|---|---|---|
| 511,482 | Great Britain | Aug. 18, 1937 |
| 652,243 | Great Britain | Apr. 18, 1951 |